US010086858B2

(12) United States Patent
Green

(10) Patent No.: US 10,086,858 B2
(45) Date of Patent: Oct. 2, 2018

(54) SYSTEM FOR INCREASING DOLLY CAPACITY

(71) Applicant: Michael Green, Saint Charles, MO (US)

(72) Inventor: Michael Green, Saint Charles, MO (US)

( * ) Notice: Subject to any disclaimer, the term of this patent is extended or adjusted under 35 U.S.C. 154(b) by 0 days.

(21) Appl. No.: 15/510,508

(22) PCT Filed: Sep. 10, 2015

(86) PCT No.: PCT/IB2015/056947
§ 371 (c)(1),
(2) Date: Mar. 10, 2017

(87) PCT Pub. No.: WO2016/038569
PCT Pub. Date: Mar. 17, 2016

(65) Prior Publication Data
US 2017/0291621 A1    Oct. 12, 2017

Related U.S. Application Data

(60) Provisional application No. 62/049,897, filed on Sep. 12, 2014.

(51) Int. Cl.
*B62B 1/12* (2006.01)
*B62B 1/14* (2006.01)
*B62B 1/26* (2006.01)

(52) U.S. Cl.
CPC ............... *B62B 1/12* (2013.01); *B62B 1/14* (2013.01); *B62B 1/262* (2013.01); *B62B 2203/44* (2013.01)

(58) Field of Classification Search
CPC ..... B62B 1/10; B62B 1/12; B62B 1/14; B62B 1/262; B62B 2203/44
See application file for complete search history.

(56) References Cited

U.S. PATENT DOCUMENTS

| | | | | |
|---|---|---|---|---|
| 4,585,130 A | * | 4/1986 | Brennan | B62B 1/14 211/190 |
| 4,726,602 A | * | 2/1988 | Sanders | B62B 1/12 211/181.1 |
| 4,921,270 A | | 5/1990 | Schoberg | |
| 5,333,885 A | * | 8/1994 | Pullman | B62B 1/10 273/285 |
| 5,465,987 A | * | 11/1995 | DellaVecchia | B62B 1/12 280/47.18 |

(Continued)

*Primary Examiner* — Brian L Swenson
(74) *Attorney, Agent, or Firm* — David E. Crawford; Crawford IP Law

(57) ABSTRACT

A dolly for transporting goods. The dolly includes a frame, a wheel assembly mounted on the frame, and a baseplate extending from the frame. The baseplate has a horizontal portion extending forward from the frame and a vertical portion extending upward from the horizontal portion. The dolly includes a handgrip attached to the frame for maneuvering the dolly and an upper support bar removably attached to and extending laterally across the frame at a pre-determined height above the baseplate. The upper support bar having a length greater than the width of the frame. The dolly includes a lower support bar removably attached to and extending laterally across the vertical portion of the baseplate. The lower support bar has a length greater than the width of the baseplate.

2 Claims, 8 Drawing Sheets

(56) References Cited

U.S. PATENT DOCUMENTS

| | | | | |
|---|---|---|---|---|
| 5,577,745 | A | * | 11/1996 | Birk .......................... B62B 1/12 |
| | | | | 242/129.5 |
| 5,611,561 | A | * | 3/1997 | Dale, II .................... B62B 1/12 |
| | | | | 280/47.19 |
| 6,131,926 | A | | 10/2000 | Harlan |
| D581,123 | S | * | 11/2008 | Henderson ..................... D34/12 |
| 7,823,893 | B2 | * | 11/2010 | Meyers ..................... B62B 1/12 |
| | | | | 280/47.18 |
| 7,886,872 | B2 | * | 2/2011 | Astor ....................... E06C 1/39 |
| | | | | 182/129 |
| 8,366,126 | B2 | | 2/2013 | Galgano |
| 8,459,515 | B1 | * | 6/2013 | Weis ....................... B62B 1/002 |
| | | | | 224/401 |
| 8,967,633 | B2 | * | 3/2015 | Drowanowski ........... B62B 1/26 |
| | | | | 280/47.18 |
| 9,033,348 | B1 | * | 5/2015 | Vadnais .................... B62B 1/10 |
| | | | | 280/47.28 |
| 9,302,690 | B1 | * | 4/2016 | Busser ...................... B62B 1/12 |
| 2003/0001348 | A1 | * | 1/2003 | Weida ...................... B62B 1/26 |
| | | | | 280/47.19 |
| 2004/0001748 | A1 | | 1/2004 | Landefeld |
| 2004/0201186 | A1 | * | 10/2004 | Tornabene .............. B62B 1/002 |
| | | | | 280/30 |
| 2007/0029745 | A1 | * | 2/2007 | Ursettie ................ B62B 3/1472 |
| | | | | 280/33.992 |
| 2010/0181737 | A1 | * | 7/2010 | Reinicke ................ B62B 1/262 |
| | | | | 280/47.19 |
| 2012/0299259 | A1 | * | 11/2012 | Carlson .................... B62B 1/12 |
| | | | | 280/47.28 |

\* cited by examiner

US 10,086,858 B2

SYSTEM FOR INCREASING DOLLY CAPACITY

BACKGROUND

The present invention generally relates to hand trucks or dollies, and more particularly, to a system for increasing dolly capacity.

Dollies are used to move goods. For example, dollies may be used to transport restaurant and office supplies from a delivery truck to a storeroom in a business. Dollies are also used to move furniture, equipment, and appliances, as well as, cylinders containing industrial gases. Generally, dollies have a vertical frame. A baseplate extends forward from a lower end of the frame and a wheel assembly is mounted on a back of the frame at the lower end. Handgrips extend from an upper end of the frame at a position where they are accessible by a user positioned behind the dolly. A user stacks boxes on the baseplate or slides the baseplate under a stack of boxes, tips the stack and frame backward so the load rests on the wheel assembly, and rolls the load to a desired destination using the handgrips to steer the loaded dolly to its destination.

Dollies are made in various widths for accommodating specific items. For example, appliance dollies are usually relatively wide and industrial gas cylinder dollies are relatively narrow. A typical dolly used to move restaurant and office supplies has a frame width in the range of about 14 to about 18 inches. This width is sufficiently narrow that most boxes and crates containing supplies span the frame and do not fall through the frame as the dolly is tipped. This width is also conveniently narrow to negotiate passageways stacked with boxes and crates, and to store the dolly in limited space. In addition, the width is sufficiently broad that the boxes and crates are stable as the dolly moves the supplies to their destination. Load instability can result in the boxes and crates tumbling from the dolly, potentially damaging the goods or injuring those next to the dolly. To increase dolly capacity, some dollies include vertical frame extensions that extend upward from the top of the frame to a height above the handgrips so goods may be stacked higher than the handgrips and safely moved from location to location. Although conventional dollies work well for their intended purposes, there remains a need for selectively increasing dolly capacity when moving larger loads.

SUMMARY

In one aspect, the present disclosure includes a dolly for transporting goods. The dolly comprises a frame having a front, a back opposite the front. The frame extends upward from a lower end to an upper end opposite the lower and. In addition, the dolly includes a wheel assembly mounted on the back of the frame adjacent the lower end and a baseplate extending forward from the front of the frame adjacent the lower end. The baseplate includes a horizontal portion extending forward from the lower end of the frame and a vertical portion extending upward from the horizontal portion adjacent the front of the frame. Further, the dolly comprises a handgrip attached to the frame for maneuvering the dolly. An upper support bar is removably attached to and extending laterally across the frame at a pre-determined height above the baseplate. The upper support bar has a length greater than the width of the frame. A lower support bar is removably attached to and extends laterally across the vertical portion of the baseplate. The lower support bar has a length greater than the width of the baseplate.

In another aspect, the present disclosure includes a method for using a dolly. An upper support bar is attached laterally across a frame of the dolly at a pre-selected distance from a baseplate of the dolly. A lower support bar is attached laterally across a vertical portion of a baseplate of the dolly. The method also includes loading stacked items abreast on the dolly baseplate and tipping the dolly on a wheel assembly. The stacked items are supported by the upper support bar and the lower support bar while the dolly is tipped. The loaded and tipped dolly are moved to a desired destination while the items are being supported by the upper support bar and the lower support bar.

In still another aspect, the present disclosure includes an accessory system for a dolly. The system comprises an upper support bar having a length greater than a width of the dolly and a lower support bar having a length greater than a width of a baseplate of the dolly. Further, the system has a fastener for attaching the upper support bar to the dolly frame at a pre-selected distance above the baseplate and a connector for attaching the lower support bar to the vertical portion of the baseplate of the dolly.

Other aspects of the present invention will be apparent in view of the following description and claims.

BRIEF DESCRIPTION OF THE DRAWINGS

Corresponding reference characters indicate corresponding parts throughout the drawings.

DETAILED DESCRIPTION OF THE DRAWINGS

Figure 1:
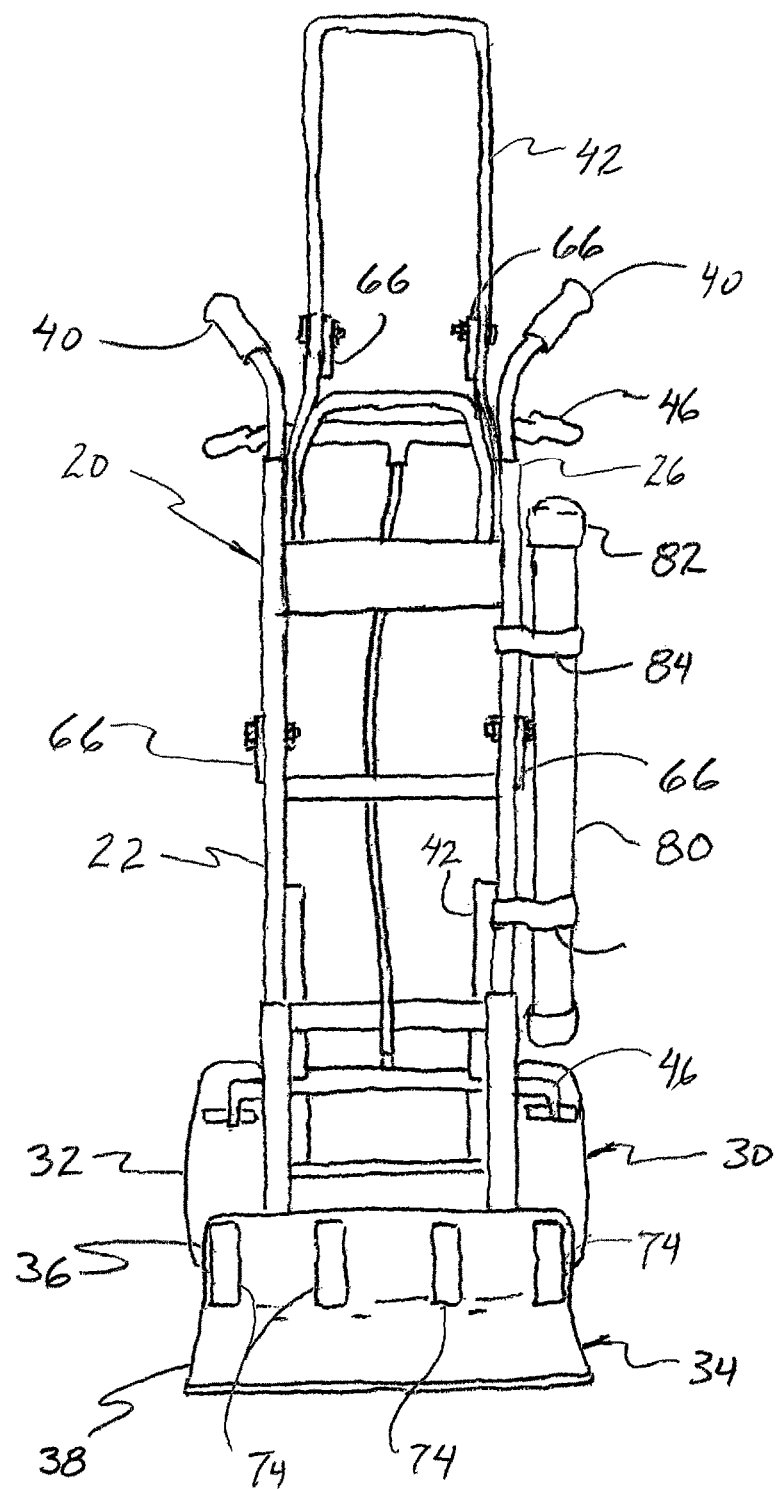
FIG. 1 is a front elevation of a conventional hand truck having a system for increasing capacity.
Figure 2:
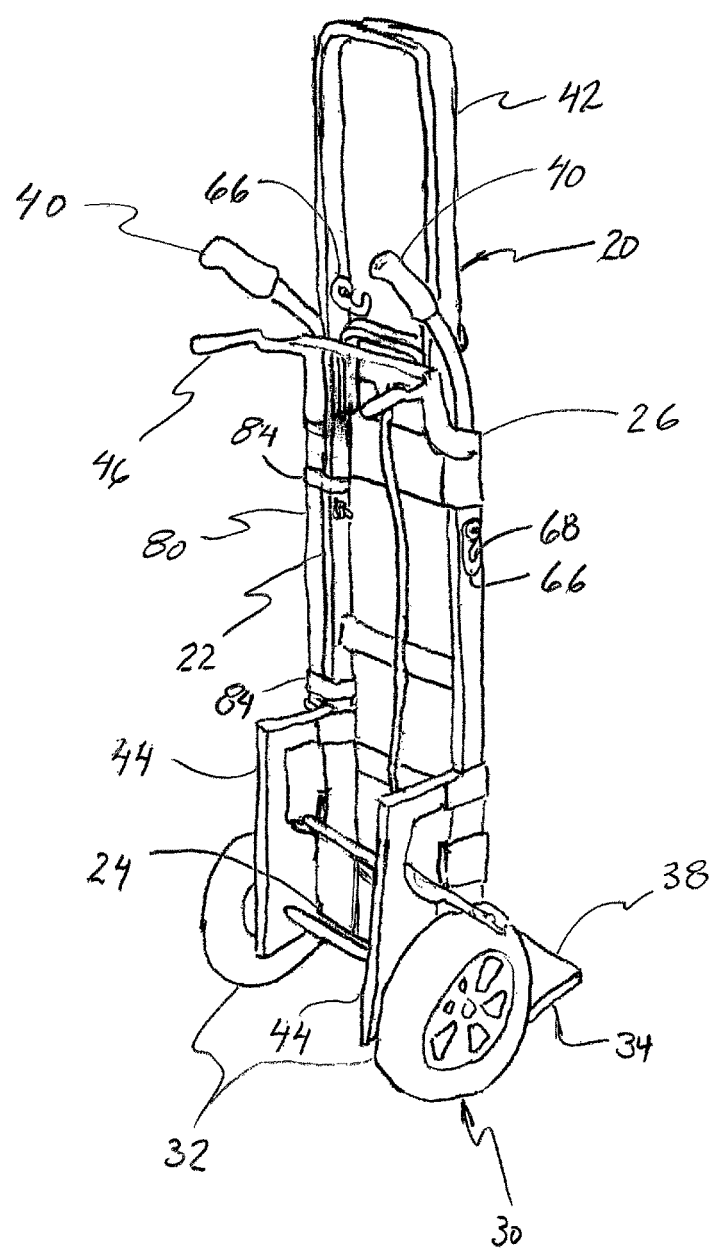
FIG. 2 is a perspective of the conventional hand truck and system of FIG. 1.

Referring to FIGS. 1 and 2, a conventional hand truck or dolly is designated in its entirety by the reference number 20. The dolly 20 includes a frame 22 extending between a lower end 24 and an upper end 26. A wheel assembly, generally designated by 30, having wheels 32 is mounted on the back of the frame 22 adjacent its lower and 24. A baseplate, generally designated by 34, is attached to the front of the frame 22 at its lower and 24. The baseplate 34 has a vertical portion 36 and a horizontal portion 38. The horizontal portion 38 of the baseplate 34 extends forward from the front of the frame 22 adjacent the lower end 24 and the vertical portion 36 extends upward from the horizontal portion adjacent the front of the frame.

The widths of the vertical and horizontal portions 36, 38, respectively, provide stability for the goods when lifted from the ground as a user tips the dolly backward. The horizontal portion 38 has a depth measured front to back that permits the dolly extend a preselected distance under the goods so the baseplate 34 supports the items or goods lifted by the dolly 20 as the dolly tips backward onto wheels 32. Handgrips 40 extend from the upper end 26 of the frame 22. For example, the handgrips 40 may be a unitary handlebar extending across the upper end 26 of the frame 22 or separate handles extending rearward from opposite sides of the frame. The user, e.g., a delivery person, grasps the handgrips 40 when tipping the dolly 20 onto its wheels 32. The handgrips 40 also permit the user to maneuver the dolly 20 when pushing or pulling the dolly 20 to the desired destination. The dolly 20 may include other features such as a vertical frame extension 42 extending upward from the upper end 26 of the frame 22, skids 44 mounted on the back of the frame 22 above the wheels 32 for supporting the dolly 20 when negotiating stairs. Further, the dolly 20 may include a handbrake 46 to prevent the dolly runaway when not in the user's grasp. In addition, the dolly 20 may include other conventional features without departing from the scope of the present invention.

Although the dolly may be made of other materials without departing from the scope of the present invention, in one embodiment the dolly frame 22, baseplate 34, and handgrips 40 are made from aluminum stock to reduce the overall weight of the dolly 20. As the features of the dolly 20 described above are conventional, they will not be described in further detail.

Figure 3:
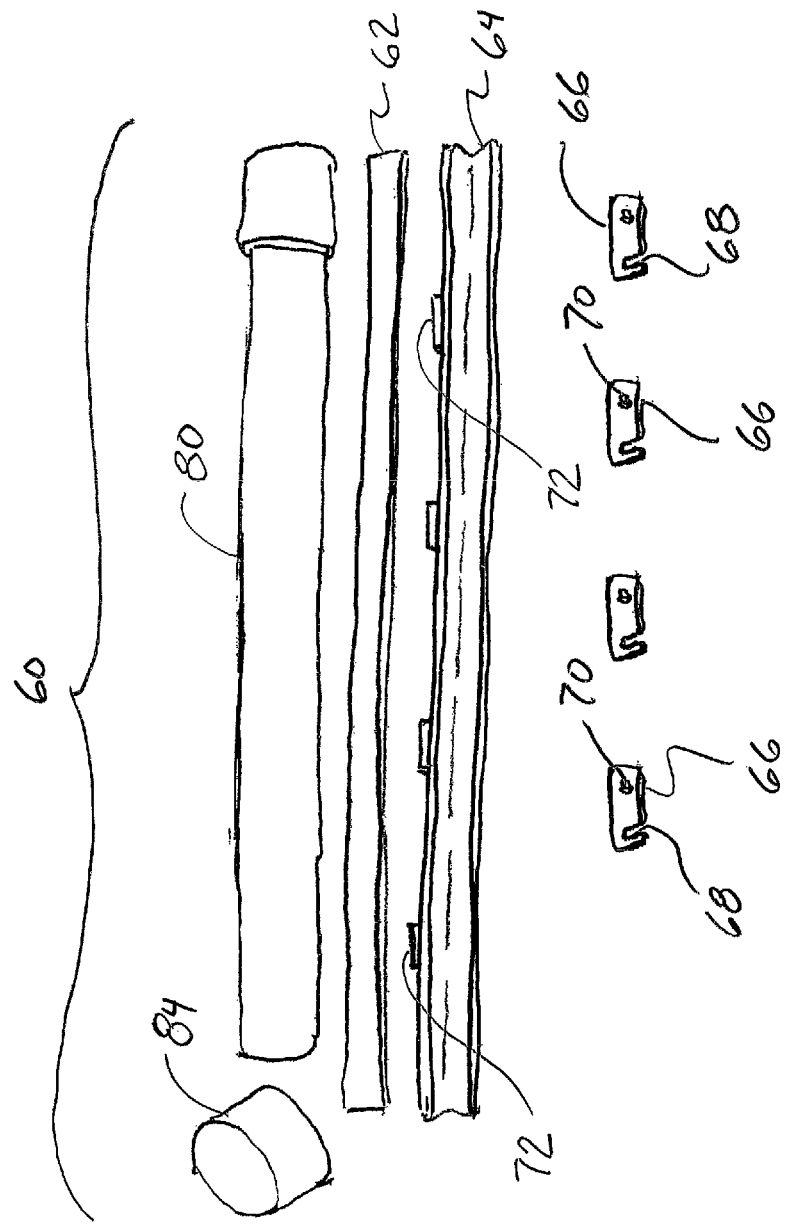
FIG. 3 is a plan of the system.

An accessory system of the present invention is designated in its entirety in FIG. 3 by the reference number 60. The primary features of the system 60 include a flat upper support bar 62 adapted to be removably attached to the frame 22 of the dolly 20 at a pre-determined distance above the baseplate 34. The upper support bar 62 has a length greater than a width of the frame 22. Although the support bar 62 may having other lengths without departing from the scope of the present invention, in one embodiment the bar as a length in a range of about 24 inches to about 36 inches. Although the upper support bar 62 may have other cross-sectional dimensions without departing the scope of the present invention, in one embodiment the bar as a width of about one inch and a thickness of about ¼ inch.

An L-shaped lower support bar 64 adapted to be attached to the baseplate 34, more particularly to the vertical portion 36 of the baseplate. The lower support bar 64 adapted to be removably attached to the baseplate 24 of the dolly 20 at the junction of the vertical and horizontal portions, 36, 38, respectively. The lower support bar 64 has a length greater than a width of the frame 22. Although the support bar 64 may having other lengths without departing from the scope of the present invention, in one embodiment the bar as a length in a range of about 24 inches to about 36 inches. Although the lower support bar 64 may have other dimensions without departing the scope of the present invention, in one embodiment the bar is formed from one inch angle having a thickness of about ⅛ inch. The upper and lower support bars 64, 62, respectively, may be made from any suitable material. In one embodiment, the upper support bar 64 is made from steel and the lower support bar 62 is made from aluminum.

The flat upper support bar 62 is attached to the frame 22 of the dolly 20 by accessory hooks 66 (broadly, fasteners) that are mounted on the frame at one or more desired distances above the baseplate 24. Although the hooks 66 may be mounted on the frame 22 using other means without departing from the scope of the present invention, in one embodiment the hooks are mounted to the frame by screw fasteners, e.g., suitable nuts and bolts. In one embodiment, one pair of hooks is mounted on the frame generally adjacent its upper end. A second pair of hooks is attached about midway up the frame 22 to provide an alternative or auxiliary upper support bar position. Although the hooks may be made of other material without departing from the scope of the present invention, in one embodiment the hooks are fashioned from ⅛ inch steel plate. Each hook 66 has a slot 68 opening upward for receiving the flat upper support bar, as well as, a hole 70 for receiving a screw fastener. The slot is shaped and sized for removably accepting the flat bar.

The lower support bar 64 is attached to the baseplate with permanent magnets 72 (broadly, connectors) adhesively attached to the bar 64. Steel sheet elements 74 may be attached to the baseplate 24 so the magnets 72 are attracted to the baseplate if the baseplate is made from aluminum or another non-magnetic material. Although the magnets 72 and steel sheet elements 74 may be attached to the respective elements by other means, in one embodiment the magnets are attached using epoxy adhesive and the sheet elements are attached with two-sided tape, permitting the sheet elements to be easily removed for use on other dollies. As will be appreciated by those skilled in the art, the upper support bar 62 and the lower support bar 64 are releasably attached to the dolly 20 so the bars may be removed from the dolly frame 22 when not in use. A tube 80 (broadly, a container or a keeper) having a lid 82 may be attached to the frame 22 of the dolly for storing the support bars 62, 64 when not in use. Although the tube 80 may be attached to the frame 22 by other means, in one embodiment the tube 80 is attached to theframe with straps 84 having cloth hook-and-loop fasteners. Thus, the tube 80 may be removed for use on other dollies. Although the tube 80 may be made of other materials without departing from the scope of the present invention, in one embodiment the tube is made from a suitable plastic, such as polyvinyl chloride.

Figure 4:
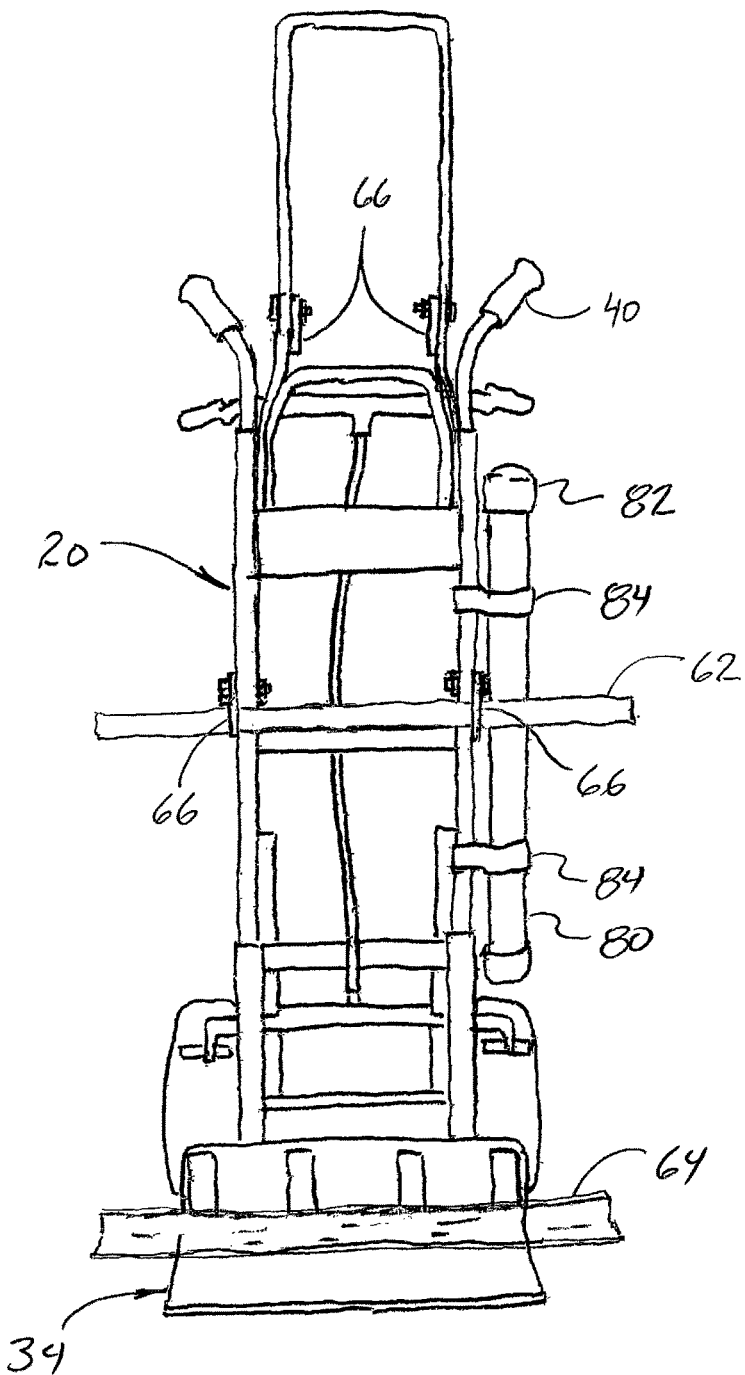
FIG. 4 is a front elevation of the hand truck having upper and lower support bars removably attached to the hand truck for increasing capacity.
Figure 5:
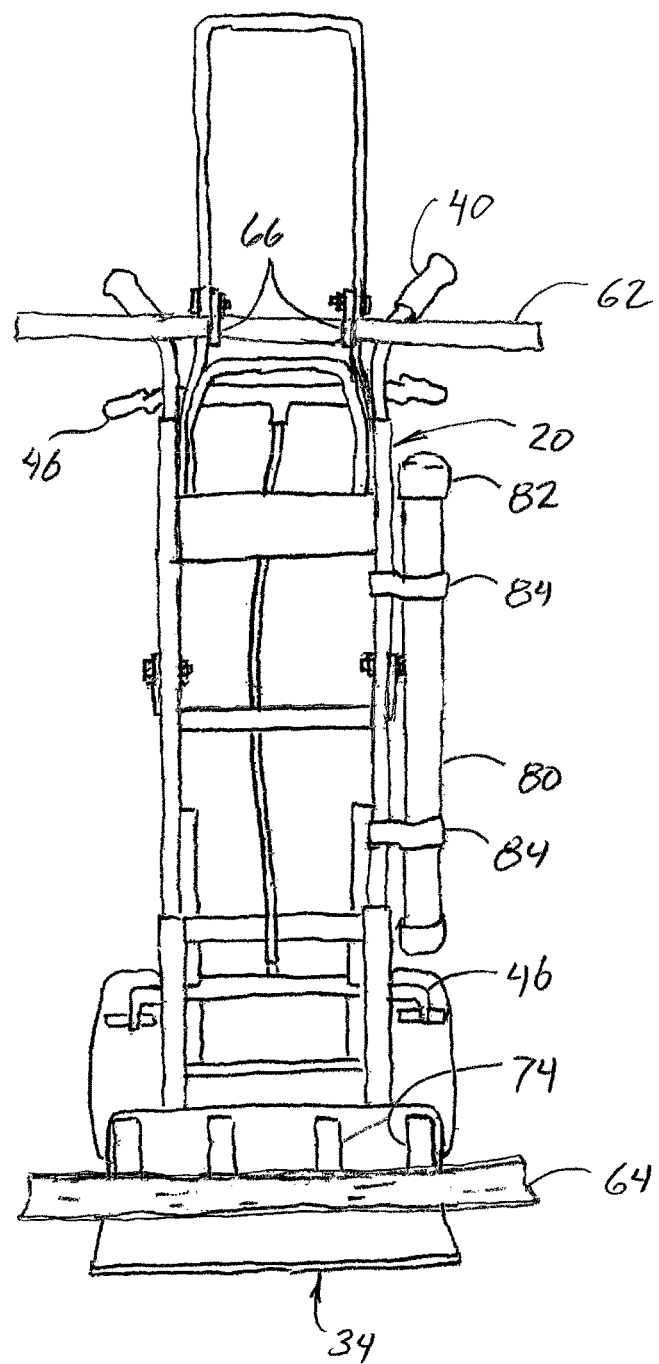
FIG. 5 is a front elevation similar to FIG. 4 showing the upper support bar in an alternate position.
Figure 6:
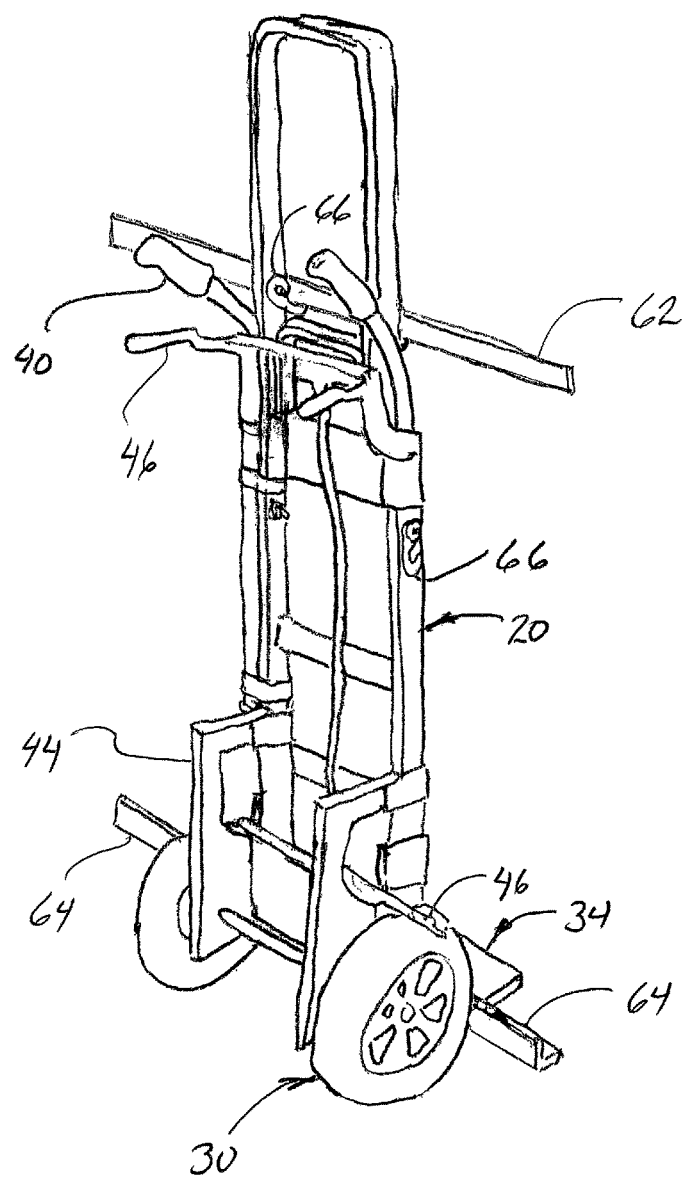
FIG. 6 is a perspective of the conventional hand truck and system shown in FIG. 5.
Figure 7:
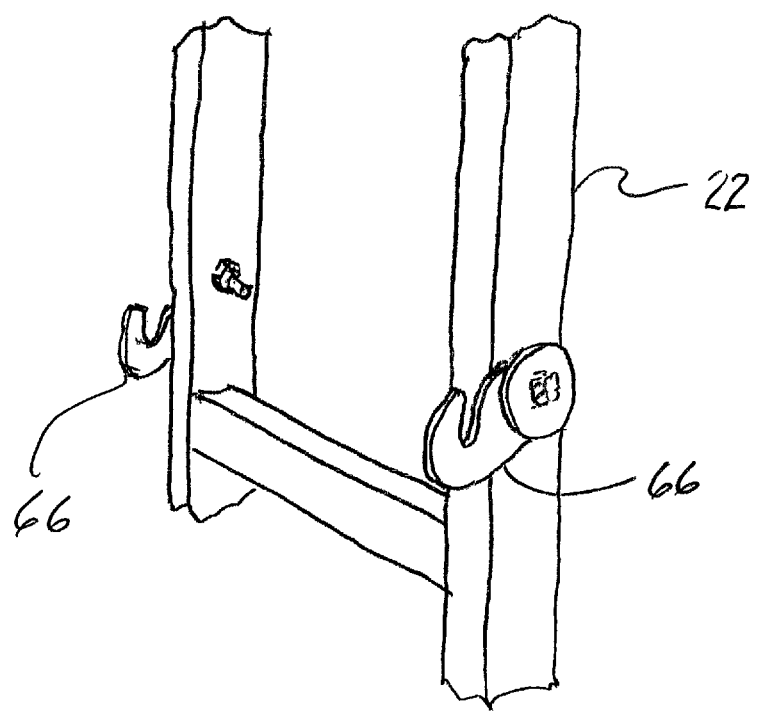
FIG. 7 is a fragmentary perspective of the hand truck showing fasteners positioned for accepting an upper support bar.
Figure 8:
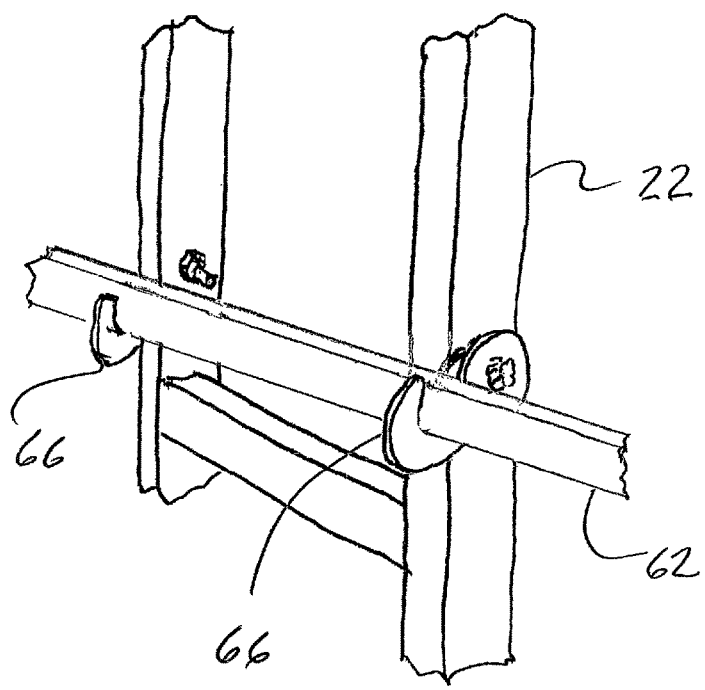
FIG. 8 is the fragmentary perspective similar to FIG. 7 showing the upper support bar installed on the fasteners.

To use the system of the present invention, the hook fasteners and steel sheet elements are attached to the frame 22, for example as described above. Once the upper bar fasteners and lower bar connectors are set up as described, the dolly may be used in a conventional manner. For instance, a stack of boxes are loaded on the dolly, the boxes and dolly are tipped so the load rests on the wheels 32, and the loaded dolly is moved to a desired destination. When the boxes are of appropriate weights and configurations that more than one stack can be carried at once, the lower support bar 64 is attached to the baseplate 26 by aligning the magnets on the bar with the steel sheet elements on the baseplate to temporarily attach the support bar to the vertical portion of the dolly baseplate as shown in FIGS. 4-6. The upper support bar 62 is positioned on the hooks as shown in FIGS. 7 and 8. The stacks of boxes are loaded on the dolly, two or more abreast, and wheeled to the desired destination. After use in this fashion, the support bars are removed from the dolly frame and stored in the tube for later use.

As will be appreciated by those skilled in the art, the accessory system increases potential capacity of the dolly when needed but stores away when not in use, allowing the dolly to travel through narrow passageways or stored in narrow spaces.

As will also be appreciated by those skilled in the art, it is envisioned that the system may be permanently installed on the dolly. For example, the hooks 66 may be permanently attached to the frame 22 by rivets or the like, either during manufacture of the dolly 20 or as an aftermarket kit. Likewise, it is envisioned the upper and lower support bars 64, 62, respectively, may be permanently attached to frame 22, such as by welding or the like, during original manufacture or after production.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A dolly for transporting goods, comprising: a frame having a front, a back opposite the front, and extending upward from a lower end to an upper end opposite the lower end;
   - a wheel assembly mounted on the back of the frame adjacent the lower end;
   - a baseplate extending forward from the front of the frame adjacent the lower end, the baseplate including a horizontal portion extending forward from the lower end of the frame and a vertical portion extending upward from the horizontal portion adjacent the front of the frame;
   - a handgrip attached to the frame for maneuvering the dolly;
   - a pair of hooks attached to the frame, each hook of said pair being movable between a stowed position in which said hook is located behind the front of the frame and a deployed position in which said hook extends in front of the frame;
   - an upper support bar removably attached to mountable in the upper pair of hooks when each hook of said pair of hooks is in the deployed position and extending laterally across the frame at a pre-determined height above the baseplate, the upper support bar having a length greater than the width of the frame, and a planar front surface spanning the length of the upper support bar, said planar front surface of the upper support bar being free of features extending in front of said planar front surface of the upper support bar when the upper support bar is mounted in the upper pair of hooks so the planar front surface of the upper support bar is adapted to support transported goods when the frame is tipped rearward; and
   - a lower support bar removably attached attachable to and extending laterally across the vertical portion of the baseplate, the lower support bar having a length greater than the width of the baseplate, and a planar front surface spanning the length of the lower support bar to support transported goods when the frame is tipped rearward.

2. A dolly as set forth in claim 1, further comprising a keeper for storing the upper and lower support bars when removed from the frame and baseplate, respectively.

* * * * *